United States Patent [19]
Menezes

[11] Patent Number: 6,139,148
[45] Date of Patent: Oct. 31, 2000

[54] PROGRESSIVE ADDITION LENSES HAVING REGRESSIVE SURFACES

[75] Inventor: Edgar V. Menezes, Roanoke, Va.

[73] Assignee: Johnson & Johnson Vision Care, Inc., Jacksonville, Fla.

[21] Appl. No.: 09/244,356

[22] Filed: Feb. 4, 1999

[51] Int. Cl.[7] ........................................................ G02C 7/06
[52] U.S. Cl. ............................................ 351/169; 351/177
[58] Field of Search ................................... 351/168, 169, 351/170, 171, 172, 177

[56] References Cited

U.S. PATENT DOCUMENTS

| | | | |
|---|---|---|---|
| 4,906,090 | 3/1990 | Barth | 351/169 |
| 5,644,374 | 7/1997 | Mukaiyama et al. | 351/169 |
| 5,691,798 | 11/1997 | Smith | 351/169 |
| 5,726,734 | 3/1998 | Winthrop | 351/169 |
| 5,771,089 | 6/1998 | Barth | 351/169 |
| 5,926,250 | 7/1999 | Mukaiyama et al. | 351/169 |

FOREIGN PATENT DOCUMENTS

| | | |
|---|---|---|
| 63-254415 | 10/1988 | Japan . |
| 876798 | 9/1961 | United Kingdom . |

*Primary Examiner*—Scott J. Sugarman
*Attorney, Agent, or Firm*—Lois Gianneschi

[57] ABSTRACT

The invention provides progressive lenses with reduced unwanted astigmatism obtained by combining progressive addition and regressive surfaces. The unwanted astigmatisms of the progressive and regressive surfaces act to cancel each other. Thus, the lens has reduced unwanted astigmatism compared to prior art lenses of comparable dioptric add power.

17 Claims, No Drawings

PROGRESSIVE ADDITION LENSES HAVING REGRESSIVE SURFACES

FIELD OF THE INVENTION

The present invention relates to multifocal ophthalmic lenses. In particular, the invention provides progressive addition lenses that incorporate regressive surfaces.

BACKGROUND OF THE INVENTION

The use of ophthalmic lenses for the correction of ametropia is well known. For example, multifocal lenses, such as progressive addition lenses ("PALs"), are used for the treatment of presbyopia. Most conventional PALs are produced by placing progressively changing radii of curvature on the convex surface of the lens to provide base curves corresponding to distance, intermediate, and near vision power zones. Typically, distance power, cylindrical power for correction of the lens wearer's astigmatism, and the axis of the cylinder are provided for on the concave surface of the lens.

PALs are appealing to the wearer because the lenses are free of the visible ledges between the zones of differing optical power that are found in other types of multifocal lenses, such as bifocals and trifocals. However, an inherent disadvantage of PALs is unwanted astigmatism, or astigmatism introduced or caused by one or more of the lens surfaces. Generally, the unwanted astigmatism is located on either side of the near and intermediate vision zones of the lens and reaches a localized maximum that corresponds approximately to the near vision dioptric add power of the lens.

Any number of lens designs have been tried in attempting to reduce unwanted astigmatism. However, although the state-of-the-art PAL designs provide some minimal decrease in unwanted astigmatism, large areas in the lenses' peripheries remain unusable due to the astigmatism. Thus, a need still exists for a PAL that reduces unwanted astigmatism.

DESCRIPTION OF THE INVENTION AND ITS PREFERRED EMBODIMENTS

The present invention provides progressive addition lenses as well as methods for their design and production. The lenses of the invention exhibit reduced unwanted astigmatism compared to prior art lenses. Additionally, the distance vision zone width and minimum channel width of the lenses of the invention are functionally uncompromised when compared to prior art PALs.

For purposes of the invention, by "channel" is meant the corridor of vision that is free of unwanted astigmatism of about 0.75 diopters or greater when the wearer's eye is scanning from the intermediate vision zone to the near vision zone and back. By "lens" is meant any ophthalmic lens including, without limitation, spectacle lenses, contact lenses, intraocular lenses and the like. Preferably, the lens of the invention is a spectacle lens.

It is a discovery of the invention that progressive lenses with reduced unwanted astigmatism may be constructed by combining progressive addition and regressive surfaces. Thus, in one embodiment, the invention provides a lens comprising, consisting essentially of, and consisting of one or more progressive addition surfaces and one or more regressive surfaces. Each surface has a dioptric add power and the total dioptric add power, or add power, of the lens is the sum of the dioptric add powers of the progressive addition and regressive surfaces.

By "progressive addition surface" is meant a continuous, aspheric surface having distance and near viewing or vision zones, and a zone of increasing dioptric power connecting the distance and near zones. One ordinarily skilled in the art will recognize that, if the progressive surface is the convex surface of the lens, the distance vision zone curvature will be less than that of the near zone curvature and if the progressive surface is the lens' concave surface, the distance curvature will be greater than that of the near zone.

By "regressive surface" is meant a continuous, aspheric surface having zones for distance and near viewing or vision, and a zone of decreasing dioptric power connecting the distance and near zones. If the regressive surface is the convex surface of the lens, the distance vision zone curvature will be greater than that of the near zone and if the regressive surface is the lens' concave surface, the distance curvature will be less than that of the near zone.

By "dioptric add power" is meant the amount of dioptric power difference between the distance and near vision zones. In the lenses of the invention, the dioptric add power of the progressive addition surface is a positive value and that of the regressive surface, a negative value. Thus, because the add power of the lens is the sum of the progressive and regressive surfaces' dioptric add powers, the regressive surface acts to subtract dioptric add power from the progressive addition surface.

It is known that a progressive addition surface produces unwanted astigmatism at certain areas on the surface. The unwanted astigmatism of an area may be considered a vector quantity with a magnitude and axis of orientation that depends, in part, on the location of the astigmatism on the surface. A regressive surface also has areas of unwanted astigmatism, the magnitude and axis of the regressive surface astigmatism are determined by the same factors that are determinative for the progressive surface astigmatism. However, the magnitude of the regressive surface astigmatism will be opposite in sign to that of the progressive surface astigmatism.

Thus, combining a progressive surface with an area of unwanted astigmatism with a regressive surface with a comparably located area of unwanted astigmatism reduces the total unwanted astigmatism for that area of the lens. The reason for this is that, in a lens having a progressive addition surface and a regressive surface, the unwanted astigmatism of the lens at a given location will be the vector sums of the surfaces' unwanted astigmatisms. Because the magnitudes of the progressive addition and regressive surface astigmatisms have opposite signs, a reduction in the total unwanted astigmatism of the lens is achieved. Although the axis of orientation of the unwanted astigmatism of the regressive surface need not be the same as that at a comparable location on the progressive surface, preferably the axes are substantially the same so as to maximize the reduction of unwanted astigmatism.

One or more areas of astigmatism of the progressive surface must overlap with one or more areas of astigmatism of the regressive surface to achieve a reduction of unwanted astigmatism. Preferably, the surfaces' distance and near zones, as well as the channels are aligned. By aligning the surfaces in such a manner, one or more areas of unwanted astigmatism on the progressive surface will overlap with one or more such areas on the regressive surface. In another embodiment, the invention provides a lens comprising, consisting essentially of, and consisting of one or more progressive addition surfaces and one or more regressive surfaces, wherein the distance vision zones, near vision zones and channels of the progressive and regressive surfaces are aligned.

In the lenses of the invention, the progressive addition and regressive surfaces may be on the convex or concave surfaces of the lens or in layers between these surfaces. In a preferred embodiment, the progressive addition surface forms the convex lens surface and the regressive surface forms the concave lens surface. One or more progressive addition and regressive surfaces may be used, but preferably only one of each surface is used.

One ordinarily skilled in the art will recognize that the progressive addition and regressive surfaces useful in the invention may be either of a hard or soft design type. By hard design is meant a surface design in which the unwanted astigmatism is concentrated below the surface's optical centers and in the zones bordering the channel. A soft design is a surface design in which the unwanted astigmatism is extended into the lateral portions of the distance vision zone. One ordinarily skilled in the art will recognize that, for a given dioptric add power, the magnitude of the unwanted astigmatism of a hard design will be greater than that of a soft design because the unwanted astigmatism of the soft design is distributed over a wider area of the lens.

In the lens of the invention, preferably, the progressive addition surfaces are of a soft design and the regressive surfaces are of a hard design. Thus, in yet another embodiment, the invention provides a lens comprising, consisting essentially of, and consisting of one or more progressive addition surfaces and one or more regressive surfaces, wherein the one or more progressive addition surfaces are of a soft design and the one or more regressive surfaces are of a hard design. More preferably, the progressive addition surfaces have a maximum unwanted astigmatism that is less in absolute magnitude than the surfaces' dioptric add power and, for regressive surfaces, is greater in absolute magnitude.

The surfaces useful in the lenses of the invention may be provided by using any known method for designing progressive and regressive surfaces. For example, commercially available ray tracing software may be used to design the surfaces. Additionally, optimization of the surfaces may be carried out by any known method.

The dioptric add power of the progressive addition and regressive surfaces are selected based on a number of factors. For example, the powers are selected based on the total dioptric add power desired for the lens as well as the unwanted astigmatism associated with a given dioptric add power. Additionally, consideration is given to the minimum channel width desired for the lens because the channel width of the lens will diminish as the dioptric add power increases. Yet another consideration is the ability to produce a cosmetically appealing lens or a lens the thickness and base curvatures of which are acceptable to the wearer.

The dioptric add power for the progressive addition surfaces used in the invention each independently may be about +0.01 to about +6.00 diopters, preferably about +1.00 diopters to about +5.00 diopters, and more preferably about +2.00 diopters to about +4.00 diopters. The dioptric add power of the regressive surfaces each independently may be about −0.01 to about −6.00, preferably about −0.25 to about −3.00 diopters, and more preferably about −0.50 to about −2.00 diopters.

The lenses of the invention may be constructed of any known material suitable for production of ophthalmic lenses. Such materials are either commercially available or methods for their production are known. Further, the lenses may be produced by any conventional lens fabrication technique including, without limitation grinding, whole lens casting, molding, thermoforming, laminating, surface casting, or combinations thereof. Preferably, the lens is fabricated by first producing an optical preform, or lens with a regressive surface. The preform may be produced by any convenient means including, without limitation injection or injection-compression molding, thermoforming, or casting. Subsequently, at least one progressive surface is cast onto the preform. Casting may be carried out by any means but preferably is performed by surface casting including, without limitation, as disclosed in U.S. Pat. Nos. 5,147, 585, 5,178,800, 5,219,497, 5,316,702, 5,358,672, 5,480,600, 5,512,371, 5,531,940, 5,702,819, and 5,793,465 incorporated herein in their entireties by reference. In another embodiment, the invention provides a method for producing a progressive addition lens comprising, consisting essentially of, and consisting of a.) providing at least one regressive surface and at least one progressive addition surface; b.) producing an optical preform having at least one regressive surface; and c.) casting at least one progressive surface onto the optical preform. More preferably, the concave surface of the optical preform is a regressive surface and a progressive surface is cast onto the convex surface of the preform.

The invention will be clarified further by a consideration of the following, non-limiting examples.

EXAMPLES

Examples 1–4

The level of maximum unwanted astigmatism for a range of dioptric add powers of VARILUX COMFORT™ lenses is shown on Table 1. The lenses have a single, soft design, progressive addition surface placed on the convex lens surface.

TABLE 1

| Example | Dioptric Add Power Front Surface (D) | Dioptric Add Power Back Surface (D) | Add Power of Lens (D) | Max. Astigmatism Front Surface (D) | Max. Astigmatism Back Surface (D) | Max. Astigmatism Total (D) | Max. Astig./ Add Power Ratio |
|---|---|---|---|---|---|---|---|
| 1 | 1.50 | 0.00 | 1.50 | −1.75 | 0.00 | −1.75 | 1.16 |
| 2 | 2.00 | 0.00 | 2.00 | −2.24 | 0.00 | −2.24 | 1.12 |
| 3 | 2.50 | 0.00 | 2.50 | −2.80 | 0.00 | −2.80 | 1.12 |
| 4 | 3.00 | 0.00 | 3.00 | −3.36 | 0.00 | −3.36 | 1.12 |

Example 5

A lens having a convex progressive addition surface and a concave regressive surface is produced. The convex progressive addition surface has a distance zone curvature of 6.00 diopters, a near vision zone curvature of 8.50 diopters, and a dioptric add power of +2.50 diopters. The surface is of a soft design type with an area of maximum unwanted astigmatism of −2.33 diopters. The concave regressive surface has a distance vision zone curvature of 6.00 diopters, a subtractive zone curvature of 7.00 diopters, and a dioptric add power of −1.00 diopters. The surface is a hard design type with an area of maximum unwanted astigmatism of +1.50 diopters. The convex surface and concave surface distance and near zones and channels are aligned and the resulting distance vision power of the lens is 0.00 diopters with and add power of 1.50 diopters. The lens' total unwanted astigmatism is less than that of a prior art progressive lens of comparable add power.

Example 6–8

Lenses are produced according to the invention with dioptric add powers of +2.00, +2.50, and +3.00, respectively.

The levels of unwanted astigmatism for the lenses are lower than those for the comparable prior art lenses.

TABLE 2

| Example | Dioptric Add Power Front Surface (D) | Dioptric Add Power Back Surface (D) | Add Power of Lens (D) | Max. Astigmatism Front Surface (D) | Max. Astigmatism Back Surface (D) |
|---|---|---|---|---|---|
| 5 | 2.50 | −1.00 | 1.50 | −2.33 | 1.50 |
| 6 | 3.00 | −1.00 | 2.00 | −2.70 | 1.50 |
| 7 | 3.50 | −1.00 | 2.50 | −3.10 | 1.50 |

What is claimed is:

1. A lens comprising one or more progressive addition surfaces and one or more regressive surfaces.

2. The lens of claim 1, wherein the lens is a spectacle lens.

3. The lens of claim 1, wherein the distance vision zones, near vision zones, and channels of the progressive and regressive surfaces are aligned.

4. The lens of claim 1, wherein the one or more progressive addition surfaces are of a soft design and the one or more regressive surfaces are of a hard design.

5. A spectacle lens comprising one or more progressive addition surfaces and one or more regressive surfaces, wherein the distance vision zones, near vision zones and channels of the progressive and regressive surfaces are aligned.

6. The spectacle lens of claim 5, wherein the one or more progressive addition surfaces are of a soft design and the one or more regressive surfaces are of a hard design.

7. A spectacle lens comprising one or more progressive addition surfaces and one or more regressive surfaces, wherein one or more progressive addition surfaces are of a soft design and the one or more regressive surfaces are of a hard design.

8. The spectacle lens of claim 7, wherein the distance vision zones, near vision zones and channels of the progressive and regressive surfaces are aligned.

9. A spectacle lens comprising a progressive addition surface and a regressive surface, wherein the distance vision zones, near vision zones and channels of the progressive and regressive surfaces are aligned.

10. The spectacle lens of claim 9, wherein the progressive addition surface is of a soft design and the regressive surface is of a hard design.

11. A spectacle lens comprising a progressive addition surface and a regressive surface, wherein the progressive addition surface is of a soft design and the regressive surface is of a hard design.

12. The spectacle lens of claim 11, wherein the distance vision zones, near vision zones and channels of the progressive and regressive surfaces are aligned.

13. A method for producing a progressive addition spectacle lens comprising:

a.) providing at least one regressive surface and at least one progressive addition surface; and b.) fabricating the progressive addition spectacle lens using the surfaces provided in step a.).

14. The method of claim 13, wherein step b.) is performed by (i) producing an optical preform having at least one regressive surface and (ii) casting at least one progressive surface onto the optical preform.

15. The method of claim 13, wherein the concave surface of the optical preform is a regressive surface and the at least one progressive surface is cast onto the convex surface of the optical preform.

16. The method of claim 15, wherein the casting step is performed so that the distance vision zones, near vision zones, and channels of the regressive surface and the at least one progressive addition surfaces are aligned.

17. The method of claim 13, wherein the fabricating step is performed so that the distance vision zones, near vision zones, and channels of the at least one regressive surface and at least one progressive addition surface are aligned.

* * * * *